United States Patent [19]

Sprinkle

[11] 3,809,467

[45] May 7, 1974

[54] AUDIO-VISUAL PRESENTATION SYSTEM

[75] Inventor: Leland W. Sprinkle, Springfield, Va.

[73] Assignee: The United States of America as represented by the Secretary of the Interior, Washington, D.C.

[22] Filed: June 14, 1972

[21] Appl. No.: 262,803

Related U.S. Application Data

[63] Continuation of Ser. No. 30,396, April 21, 1970, abandoned.

[52] U.S. Cl. .................................................. 353/15
[51] Int. Cl. .......................................... G03b 31/06
[58] Field of Search ................................ 353/15–19

[56] References Cited

UNITED STATES PATENTS 3,580,669 5/1971 Beeler .................................. 353/15

*Primary Examiner*—Louis R. Prince
*Assistant Examiner*—A. Jason Mirabito
*Attorney, Agent, or Firm*—Gersten Sadowsky

[57] ABSTRACT

Synchronized and coordinated operation of a slide projector and tape playback mechanism for a programmed performance is effectuated by a directing arrangement which operatively responds to control signals derived from the tape and a signal generator made effective in response to a predetermined slide projector operation. A photo-cell and thyristor component of the arrangement, functioning as a switch in response to tape signals, acts through preset contacts of a latching relay to complete a circuit wherein a slide changer of the projector is activated. The signal generator provides a signal which conditions a further switching component of the arrangement to complete a circuit for repositioning latching relay contacts whereby a program terminating operation of the tape playback and projector ensues in response to an extended control signal from the tape and continues until the tape and slide projector are again conditioned for a program start.

5 Claims, 4 Drawing Figures

Figure 2:
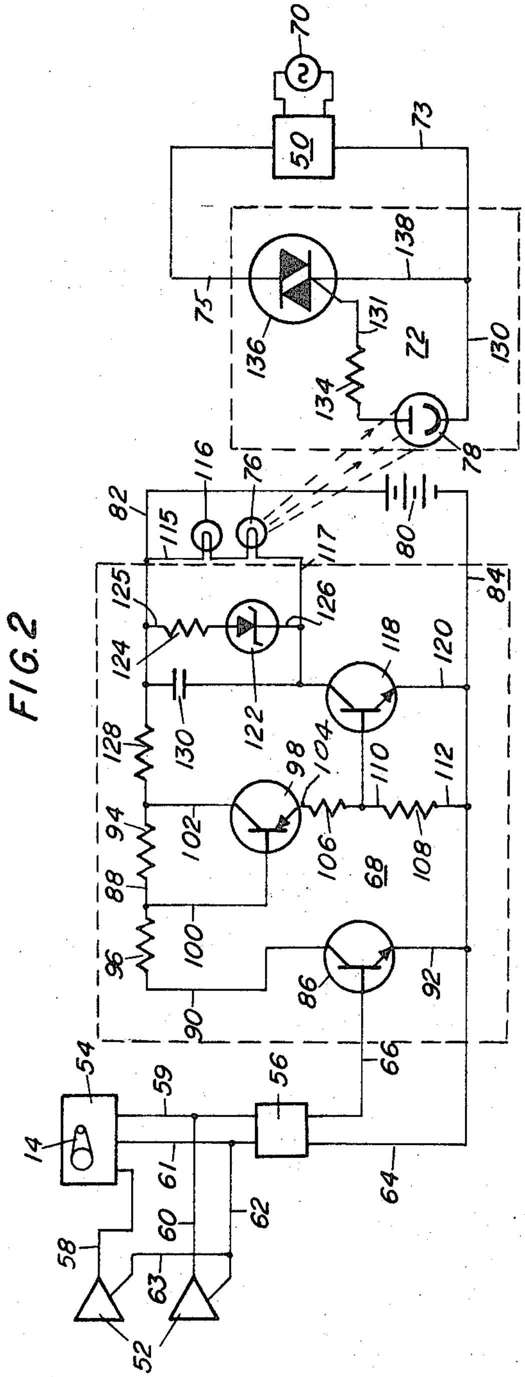

INVENTOR
LELAND W. SPRINKLE
BY Ernest S. Cohen
Gersten Sadowsky
ATTORNEYS

AUDIO-VISUAL PRESENTATION SYSTEM

This application is a continuation of U.S. Pat. Ser. No. 30,396 filed Apr. 21, 1970, and now abandoned.

An improved combined audio-visual presentation system is the subject of the present invention. The improvement affords a more reliable matching of the sequences in which individual visual showings are presented for viewing and stereo audio messages related to such showings are delivered. A closely integrated control applied to the interactions between audio and visual components of the system in the present invention allows repeated presentations of complete programs without the use of ancillary tape-projector synchronizing or adjusting equipment.

Presentations of audible messages from tape recordings contemporaneously with screened pictures from a slide projector have been made previously using slide chaning sequencing signals produced from a tape also providing the sound, or separate tapes. A U.S. Pat. No. 3,447,864, issued on June 3, 1969, to M. A. Shadley III, discloses a visual and sound presentation system of this type which employs a dual channel tape whereon one channel carries the sound, and the second channel carries signals for directing slide changing operations. A switch controlled oscillator is used to produce signals for recording on the second channel. However, other than for the usual starting devices used in the patented system no provision is made therein to achieve regular synchronization of the tape and projector operations between performances of a presentation. Audio-visual presentations of the type described herein, which are often associated with unattended display arrangements, require at the start of each performance that the taped message then disposed for playback be the one intended for delivery with the particular picture first aligned for projection. Initial message to picture correspondence is critical where the tape carries the slide change control signals since if the first message transpires before a picture is projected subsequent messages will be incorrectly associated with projected pictures which follow. Provisions heretofore made to avoid the aforesaid out-of-correspondence rely on solenoid actuated switch operations controlled by picture changing functions, examples of which are disclosed in U.S. Pat. No. 3,177,767, issued Apr. 13, 1965, to B. E. Templeman, and U.S. Pat. No. 3,342,103, issued Sept. 19, 1967, to W. J. Fabrey.

Requisite synchronization between sound and picture presentations is achieved in the present invention through the use of a signalling means also providing slide change control signals. More particularly, the terminal portion of a tape recording employed in the invention for sound and control purposes, carries as its content following the last slide related message, a continuous slide change command signal which is exerted to the end of the tape. Additionally operative following completion of the presentation material is a signalling arrangement which responds to a magnetic device set on a rotary picture slide carrier of the projector. When the device is appropriately positioned by a continued step drive to the rotary carrier after presentation of the last picture, a signal produced from the aforesaid arrangement is effective to switch-off primary system start controls. However, secondary operational controls, which are made effective responding to the switch-off action, cooperate with the aforesaid extended command signals from the tape recording to maintain operational tape playback drives and termination conditioning mechanisms in the projector until restoration of the tape to correspond to the rotary carrier in an initial condition of the projector is thereby accomplished.

Direction of the present invention system between the alternating conditions therein of performance presentation and operation completion following each presentation, is largely facilitated by the operation of a single multi-contact latching relay of the invention. Circuits initially completed through contacts of this relay to energize a projection lamp, a blower for dissipating lamp heat, picture slide-change devices, a tape motor drive and playback circuitries, are opened upon operation of this relay in response to a stop signal from a magnetically controlled signalling arrangement in the projector, whereas in this alternate condition other relay contacts are closed to complete circuits wherein the blower, tape drive and playback circuitries, are maintained energized during a time wherein operation completion is effectuated. Control signals derived from the tape recording output and the magnetically operated signalling arrangement ultimately become effective by way of light-triggered solid-state switching components of the invention. Lamps energized in the signal circuits light in enclosures also containing responsive photocell elements which trigger thyristors biased thereby to conduct in the aforesaid system control circuits completed through contacts of the latching relay.

Equipment presently in use to record control signals on magnetic tape, or the like, generally includes electrical switch devices which may be operated by hand to effectuate signal input to a record; the portable pulse generator disclosed in the above-identified patent to Shadley III being exemplary of such devices. Where, as in the present invention inaudible control signals are intermingled with recorded sound on at least one channel of a stereo output to speakers, it is important to avoid all extraneous sound, including switch clicks due to the actuation of switch contacts. The present invention therefore also comprises a method and means for forming and timing control signals for recording wherein discrete light flashes are applied to an enclosed photocell element operable as a switch in the recording circuit. A time and aperture-controlled camera-shutter mechanism mounted over an opening in the photocell enclosure is exemplary of mechanism for producing the requisite light flashes.

An audio-visual presentation system automatically controlled to fully reset starting condition all mechanisms therein following the completion of a presentation thereby is an important object of the present invention.

Another object of the present invention is to provide in an audiovisual system mechanism operatively responsive to playback of a magnetic tape having recorded thereon messages related to the subject of the pictures shown, signals to sequence the showing of such pictures in conformity with the message intervals, and a further signal to facilitate fully conditioning all mechanisms of the system for a restart following the end of the presentation thereby.

A further object of the present invention is to provide a method and means by which is recorded on magnetic tape carrying audio messages a predetermined arrangement of inaudible control signals substantially without electrical phenomena noise.

Figure 1:
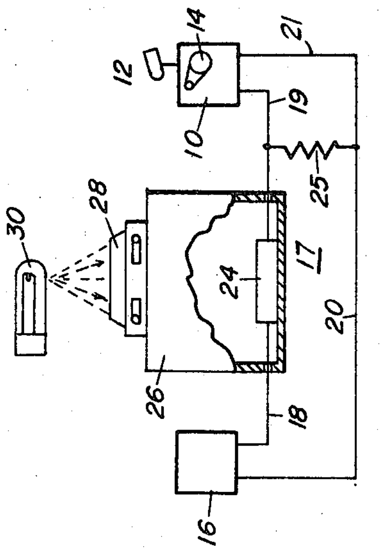
Figure 3A:
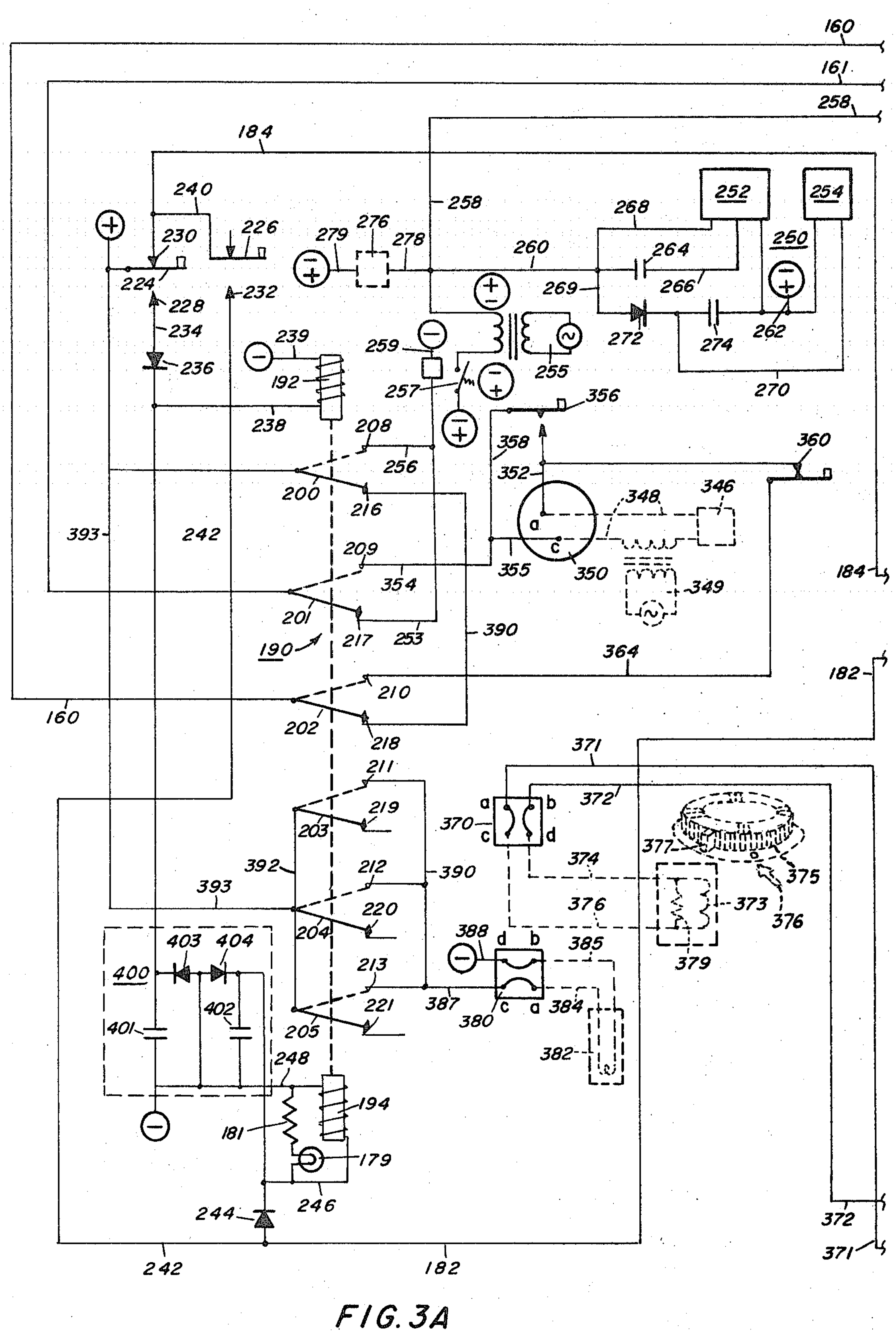
Figure 3B:
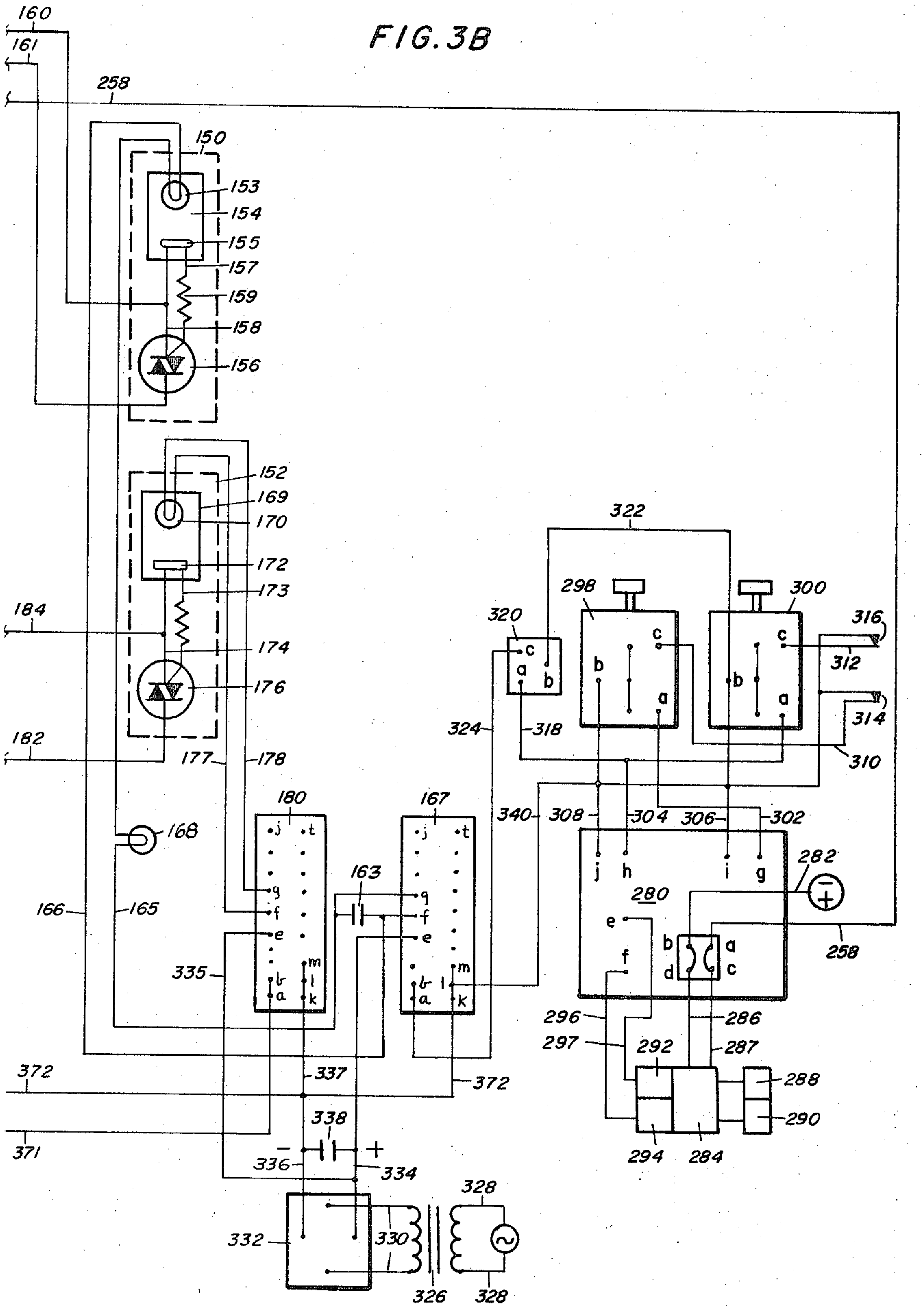

The invention will be further explained and other objects thereof will become apparent with reference to an embodiment of the invention illustrated by way of example in the showing of the accompanying drawing wherein:

FIG. 1 is a simplified schematic showing of a tape recording arrangement including in part a cross-sectional view of a mechanism facilitating static-free recording of control signals;

FIG. 2 is a generalized schematic diagram of the invention including electrical circuitry details of an amplifier appearing in cooperative relationship with tape recording playback equipment and a solid state switching arrangement for controlling the operation of a slide projector; and FIG. 3A and 3B make up a detailed schematic showing of circuitry and components operatively associated therewith constituting a preferred embodiment of the invention.

A tape recording having utility in connection with the operation of the arrangements appearing in FIGS. 2, 3A and 3B, is readily prepared by equipment such as shown in FIG. 1. A tape recorder 10, is represented in FIG. 1 as operable to receive voice input at a microphone 12 for recording on a tape 14. An endless magnetic recording tape in a removable cartridge of conventional construction is preferred for use in the disclosed embodiments of the present invention. Commentary, music, and other sound effects are also received, alone or in combination, as inputs which produce the requisite messages on the tape. The sequence and timing with which these messages are recorded are set to correspond with that in which slide-mounted transparency pictures are to be projected on a screen, so as to constitute an accompaniment for the pictures. Uniform, low frequency, inaudible signals are singly recorded on tape 14 to correspond to some part of each of the aforesaid messages. These inaudible signals are derived from an oscillator 16 having a conventional design and which produces an output in the range of 30 cycles per second. Cyclic signals from oscillator 16 are transferred to recorder 10 by way of a circuit 17 comprising loads 18, 19, 20 and 21, in which a photocell 24 connected between the oscillator and recorder, and a resistor 25 connected across the recorder constitute separate segments of a voltage divider which determines signal amplitude. Photocell 24 is adapted thereby to respond to radiant energy intermittently flashed thereon with a switching action controlling the operation of the signal transfer circuit.

A housing 26 is provided to shield photocell 24 from ambient light that would affect the sensitive substance thereof. Secured within an opening through the top of housing 26 is a light shutter device 28, in the nature of a camera shutter having time setting and time exposure mechanisms. A source of light 30 is disposed above the shutter opening beneath which photocell 24 is affixed in a lower part of a housing 26 with the circuit leads connected thereto passing through constrictive openings in the housing. Thus, light from source 30 is allowed to strike the sensitive surface of photocell 24 only for predetermined intervals set by adjustment of the timing mechanisms of shutter device 28. In a time setting of one-tenth of a second employed in the preferred operation of the equipment shown in FIG. 1, photocell resistance is lowered sufficiently during the interval light reaches it to permit conduction in signal transfer circuit 17 whereby approximately three full cycles of 30 cycle oscillation output become effective in recorder 10. A long signal, which is initiated for playback following shortly after the completion of the message material corresponding to the last picture transparency slide projected for a particular program, and subsequently completed following a full excursion of the rotary slide carrier, is formed by setting open the time exposure device on shutter device 28 for a corresponding time. Since uniformly timed signals are made available for ordering slide changes in a manner to be hereinafter fully described, such unitary signals provide the same slide changing time between each of the slides. Thus, the precise control of the oscillator signal precludes recording inadvertent overly long slide change signals between program slides which would result in two or more slide changes where only one change was required. Moreover, since the means provided to apply these signals to tape 14 at appropriate times does not include driven electrical parts, such as button, cam or solenoid actuated switch contacts or commutators, the possible production of static which could be recorded on the tape as audible noise, is also effectively precluded.

When tape 14 is prepared as heretofore explained, it is applicable for use in the arrangement represented in FIG. 2 to coordinate the functions of a slide projector 50 with the output of a speaker system 52 throughout continuous presentations of an audio-visual program. Projector 50 of the preferred embodiment herein is of the type disclosed in U.S. Pat. No. 3,276,314; issued Oct. 4, 1966, to H. T. Robinson. A top-mounted, circular picture slide tray employed in the patented projector apparatus can be automatically indexed to position one slide at a time in means for lowering the slide into the path of the apparatus optical projection system, and subsequently returning the slide to the tray. These slide-changing indexing cycles are initiated by energization of a solenoid which releases a clutch spring permitting a motor drive to rotate a cycle-controlling cam shaft. Reverse operation is accomplished by the accompanying energization of a second solenoid which shifts a cam surface from a forward directing disposition to a reverse directing disposition. Speaker system 52 is representative of an audio output apparatus, and preferably a conventional stereo sound system receiving input from an appropriate two-channel recording on tape 14. A conventional endless tape device playback 54, comprising a tape player not requiring any conventional rewind, supplies the message material and command signals of the tape recording to speaker system 52 and a 30 cycle filter 56. Circuitry completing connections from the playback device to the speaker system and filter includes energizing leads 58, 59, and 60, and return leads 61, 62 and 63. The 30-cycle command signals being ineffective to operate speaker system 52, are inaudible, whereas filter 56 passes only 30-cycle command signals as its output on leads 64 and 66 connected to an amplifier 68. On the other hand, the activation of units such as the lamp, blower and solenoids in projector 50 is accomplished by current received from an a-c source 70. However, a switching unit 72 provided to control projector operations by way of a slide triggering circuit completed through leads 73 and 75, is responsive to amplifier operation which establishes its control through a photoelectric coupling between a light source 76 energized by the amplifier output and a photocell 78 in the circuit of the switching unit.

Amplifier 68 includes d-c source 80 having positive and negative terminal connections to leads 82 and 84, respectively. Command signal input on lead 66 is received in the amplifier at the base of an NPN transistor 86, whereas input lead 64 joins the d-c source negative by way of lead 84. Since only the positive halves of the command signal cycles applied to lead 66 bias transistor 86 to conduction, this transistor functions as a half-wave rectifier when conducting through its collector-emitter in a circuit traceable from the d-c source positive on leads 82, 88, 90, and to the d-c source negative on leads 92 and 84. A high resistance 94 and a substantially lower resistance 96 are serially connected in the aforesaid transistor circuit by way of circuit lead 68 extending between the resistances. A voltage divider constituted thereby with respect to the base-collector junction of a PNP transistor 98 places resistance 94 across the transistor junction by way of leads 88, 100 and lead 102 which lead 82 joins to the d-c source positive. Since the potential at the base of transistor 98 is thus negative with respect to the source positive potential seen at its collector through leads 82 and 102, emitter to collector conduction occurs therein through a circuit comprising leads 82, 102 and 104, a resistance 106, and a relatively higher resistance 108, joined by a lead 110, and a lead 112 connected by lead 84 to the d-c source negative.

When transistor 98 is caused to conduct as hereinbefore explained, it initiates current flow in the amplifier's load circuit which is traceable from source positive on lead 82 to a lead 115, through a lamp 116 in series with lamp 76, a lead 117, the collector-emitter of a NPN power transistor 118, and to source negative on leads 120 and 84. Since leakage current normally flowing through the collector-base of transistor 118 is dissipated in resistance 108, this transistor remains reversely biased by the resultant negative potential at its base until transistor 98 conducts to give rise to a potential drop across resistance 106 which overcomes the negative bias of transistor 118. Leakage is minimized in amplifier 68 to cut down on noise which may interfere with the production of the requisite light signals for controlling projector operation. Further, voltage in the load circuit energizing lamps 116 and 76 is regulated so as not to exceed a predetermined magnitude. Provided for this purpose are a zener diode 122 and a resistance 124 in a series circuit which is connected by leads 125, 82, and 126, 117 to shunt across the lamps and bridge between source positive and the collector of transistor 118. The diode plate electrode is unconventionally connected to positive of source 80 such that breakdown does not occur until the aforesaid predetermined voltage magnitude is reached whereupon conduction through the diode acts to limit as indicated the energizing voltage available for the lamps in series. Current limiting resistance 124 is provided to protect the zener diode. A tank circuit, comprising a load resistance 128 leading to a juncture with a smoothing capacitance 130, is connected to the load circuit at its input leads 82 and 117, and functions in a conventional manner to smooth out the half-waves in the rectified voltage supplied thereto. Since resistance 128 limits spurious voltage spikes of amplifier input to a level which does not overly charge capacitor 130, the resistance effectively prevents redundant lighting of lamps 76 and 116. Lamp 116 is mounted on display in a control panel visible to an operator so as to indicate by its illumination that the normally inclosed control lamp 76 is conductive and operable in their series circuit.

Responding to the light from lamp 76 which impinges on photocell 78, switching unit 72 becomes operable to complete the circuit wherein power from an a-c source is applied to operate a slide change triggering device in projector 50. Specifically, light absorbed by photocell 78 lowers its resistance in a series circuit comprising leads 73, 75, 130, and 131, which constitute connections completing the circuit to a current limiting resistance 134, and the gate of a three electrode thyristor 136 such as a Triac. As a result, a-c voltage sensed at the gating circuit initiates breakdown and conduction through the symmetrical semiconductors of thyristor 136, and therewith conduction in the slide triggering circuit comprising leads 73, 75, and 138. Control devices of projector 50 rendered operable by the circuit conduction thus facilitate a visual presentation in conjunction with the audio output of speaker system 52.

The audio-visual program presentation control apparatus schematically shown in FIGS. 3A and 3B is in essence a special embodiment of a concept previously demonstrated with reference to the elementary control arrangement appearing in FIG. 2. More particularly, components 150 and 152 appearing in FIG. 3B, each represents a lamp-photocell and thyristor combination having operational characteristics corresponding to that of the FIG. 2 switching unit 72 in its cooperation with lamp 76. A small lamp 153 affixed within the head of a cup-like enclosure 154 of component 150 is arranged thereby to face a photocell 155 disposed within the well of the enclosure. Component 150 also comprises a thyristor 156, and circuitry including leads 157 and 158 for connecting, by way of a current limiting resistance 159, a gate electrode of the thyristor to photocell 155 which upon exposure to light enables conduction in the circuitry resulting in the triggering of thyristor 156 by potential at its gate electrode. The resultant conduction in thyristor 156 passes through connections at its anodes with leads 160 and 161 which extend to switching contacts of a mechanically latched, two-position control relay 190. Energizing current for lamp 153 is supplied on leads 165 and 166 having connections to terminals f and g, respectively, on a terminal panel 167 of a tape signal playback amplifier similar to amplifier 68. A long-life pilot lamp 168 connected in lead 165 provides indications of a command signal input to the control apparatus, and the operational condition of lamp 153, as was previously explained with respect to lamp 116 shown in FIG. 2. Component 152 likewise comprises a cup-like enclosure 169 wherein a lamp 170 and a photocell 172 cooperate to determine conduction in a circuit, including leads 173 and 174, for controlling the operational state of a thyristor 176 in a manner heretofore explained. Lamp 170 is energizable in a circuit comprising leads 177 and 178 extending from a terminal panel 180 of a further amplifier, at terminals f and g thereof. Whereas amplifier output to the circuit energizing lamp 153 is supplied in response to a slide change command signal sensed from the playback of tape 14, the output to the lamp circuit, including leads 177 and 178, from the further amplifier, represented by its terminal panel 180, is in response to a stop command signal generated in the projector, as will hereinafter be more fully explained. Connections to the anodes of thyristor 176 are made through leads 182 and 184 which comprise a function control circuit for relay 190.

As indicated above, a functional control sequence underlying the exercise of the present invention is largely dependent on the operational states of latching relay 190. Separate electromagnetics 192 and 194 of relay 190 are energizable alternately whereby the electromagnetics are operable to shift a set of pivotal contact arms 200 to 205, inclusive, between engagement with a first set of fixed contacts 208 to 123, and engagement with a second set of fixed contacts 216 to 221. Connections to a source of electrical power, represented by the circled positive and negative signs appearing in FIG. 3A, are completed either to the coil of electromagnet 192, or to the coil of electromagnet 194, by the actuation of a start button 224, or a stop button 226, respectively. The energization of electromagnet 192 shifts relay contact arms to as to effect circuit connections through a set of upper relay contacts 208 to 213, which start an operational control sequence in the apparatus. The subsequent energization of electromagnet 194 shifts the relay arms back to the initial disposition thereof so as to complete circuits through contacts of a set of lower contacts 216 to 221, which initiate operational steps toward the conclusions or stopping of an operational sequence. Relay 190 is constructed such that it is mechanically latched in its start or stop state to which it is set by activation of one electromagnetic until reset by the activation of the other electromagnet.

When start button 224 is actuated for closure at a contact 228 thereof, it completes a circuit including lead 234, a diode 236, and lead 238, applying voltage from source positive at the start button to one end of electromagnet 192, the other end of the coil being connected to source negative. The resultant energization of electromagnet 192 shifts the pivotal arms of relay 190 to engage them with the upper contacts of the relay. Made evident by further reference to FIG. 3A is that the stop control ordinarily available upon the actuation of button 226, wherein a contact 232 is engaged for completing a circuit from positive potential at button 224, when normally closed on contact 230, through lead 240, the actuated stop button, lead 242, diode 244, lead 246, the coil of stop electromagnet 194, and lead 248 to a source negative potential, becomes disabled any time that start button 224 is actuated since the afresaid stop circuit is then open at contact 230. Movable contact arms 200 to 205 of relay 190, which are shifted by energization of the start electromagnet 192, are held latched in position to engage fixed contacts 208 to 213, as indicated by the dashed line showing of the contact arms in FIG. 3A.

Several major components of the overall apparatus are activated in response to the circuit closure effected by contact arm 200 at fixed contact 208 of relay 190. Thus a circuit arrangement 250, in which a tape recorder synchronous motor 252 and a magnetically operated lock of a tape guiding roller 254 are energized, is supplied with power from an a-c voltage source 255 with the closure of a normally open switch contact 257 of a relay activated by current in a circuit completed from source positive at contact arm 200 by way of contact 208, lead 256, and lead 259 to source negative. The power circuit to arrangement 250 is completed in circuitry comprising leads 258, 260, and a lead 262 returning to the a-c source. A motor starting capacitor 264 in lead 266, and lead 268 of arrangement 250 connects power to motor 252, whereas further leads 269 and 270, including a diode 272, and further capacitor 274 in lead 269, extend the power circuit to the guide roller lock. Projector equipment represented by the dashed line enclosure 276, which includes a cooling blower, is also supplied with power available from a-c source 255 by way of leads 258, 278, and a source return lead 279.

A terminal panel 280 provided in the tape playback section of the apparatus receives power input at supply terminals *a* and *b* of the panel by way of a circuit including lead 258, and a lead 282 returning to a-c source 255. A combined power supply rectifier and preamplifier 284 in the tape playback arrangement is in turn supplied with a-c power on leads 286, 287, connected to panel 280 at terminals *c* and *d* thereof which are joined to panel input terminals *a* and *b*, respectively. An independently controlled a-c supply can serve as an alternative power source for the playback arrangement. The tape playback arrangement is characterized by signal detection in two channels employing magnetic heads 288 and 290, and separate volume-control circuitries 292 and 294 having connections to further volume-control devices and speakers by way of cables 296 and 297 leading to terminals *e* and *f* on panel 280. Further left and right speaker output volume controls are represented in FIG. 3B as T-pad terminal panels 298 and 300, respectively. Conventional T-pad circuitry having terminals on the separate panels includes a first adjustable resistance in a channel amplifier output lead with connections to a second adjustable resistance shunted across the leads to the speaker associated therewith. Each T-pad is equipped with a single knob for setting both resistances to obtain a speaker circuit impedance, matching that of the amplifier output. Positive speaker connections to leads 302 and 304 from terminals *a* on the respective T-pads extend to positive speaker terminals *g* and *h* on panel 280, and negative speaker connections to leads 306 and 308 from terminal *b* of the respective speaker terminal panels extend to negative speaker terminals *i* and *j* on panel 280. Additional left and right speaker leads 310 and 312 extend from terminals *c* on the appropriate one of T-pads 298 and 300, to left and right phono-plugs 314 and 316. Volume level for the separate channels is set by initially adjusting volume controls on the respective amplifiers 292 and 294 to about three-fourths of their maximum, and thereafter adjusting the T-pad knobs to the volume level desired.

Output of one of the channels also provides current on a lead 318 connection between an audio terminal *h* of panel 280, and a 30 cycle filter terminal panel 320 at a terminal a thereof. A circuit return lead 308 from terminal *j* of panel 280 extends by way of T-pad 300 and a lead 322 to a terminal *b* of panel 320. Inaudible 30-cycle program control signals corresponding to such control signals previously considered in explaining FIGS. 1 and 2, are thereby made available at a terminal *c* of panel 320 and from where they are transmitted on a lead 324 as an input to the amplifier having terminals on panel 167. A low-voltage supply for the amplifier represented by terminals on panels 167 and 180 is derived in a transformer 326 supplied from an a-c source on leads 328, which in turn provides output on leads 330 to a recitifier 332. Rectifier output on leads 334 and 336, across which smoothing capacitor 338 is connected, and further leads 335 and 337, supply positive and negative low voltage direct current to the amplifiers by way of terminal *e* and linked terminals *m, l, k*, respectively, of the amplifier panels 167 and 180. The negative terminals are further linked to the negative leads of the tape signal circuitry by a lead 340.

Slide changing functions of the projector are accomplished by devices to which requisite settings and displacements are imparted by solenoid operated actuators, all in a manner disclosed for such means by the descriptions in U.S. Pat. No. 3,276,314, issued on Oct. 4, 1966, to H. T. Robinson. A slide changer mechanism of this type, which appears in FIG. 3A as a dashed line representation 346, receives energizing power for the solenoid arranged to operate therein on leads 348 having connected therein an a-c source 349, and connections through lead terminal pins which are received in a socket 350. Energizing circuits from the plug are extended from terminals a and c thereof on leads 352 and 354, 355, respectively, and in turn leads 354 and 352 are respectively connected to fixed contact 209 of relay 190, and a fixed contact of a manually operable switch 356 having a movable contact connected by way of leads 358 and 355 to the socket terminal c. Switch 356 constitutes a manually operable slide change device providing an auxiliary program advance control. A normally closed switch 360 is also made part of the slide changer control circuit by way of a lead 362 extending from a juncture with lead 352, and a further lead 364 which connects switch 360 to fixed contact 210 of relay 190. As will hereinafter be explained more fully, switch 360 is adapted when actuated to open its contacts with the result that the slide change control circuit is broken at the switch whether it was completed by way of leads 354, 358, and 352, and contacts closed at switch 356, or completed through contacts 209 and 210 of relay 190, and by way of leads 354, 352 and 362, normally closed switch 360, and lead 364.

An additional plug 370 retains connections at terminals *a* and *b* thereof, with leads 371 and 372, respectively. Lead 371 extends to amplifier panel 180 where it is connected to terminals *a* and *b*, and lead 372 provides a path by way of lead 337 to the common negative circuitry leading to terminals *m, l, k* of the panel. Terminals *a* and *b* of plug 370 are conductively linked to its terminals c and d which in turn have secured thereto leads 374 and 376 completing circuit connections to a signal generating electromagnetic coil 373. This signalling coil is located in a compartment of the slide projector casing where it is separated by maximum possible distance and a soft iron shield from the projector's blower motor to reduce effects of the motor's magnetic field cutting through the coil winding. The projector's top-mounted rotary slide carrier 375 is positioned with its 0 slot facing the fixed arrow index 376 on the projector casing in preparation for the installation of a small magnet 377 at a location on the bottom periphery of the carrier which is directly over coil 373. The 0 slot relationship to the fixed arrow index at each start of a cyclic slide-changing operation and during subsequent displacements of carrier 375 in a cycle of operation, more fully appears in the detailed disclosure of the previously identified patent to H. T. Robinson, and particularly this patent's "General description" and "Slide tray" sections when considered together with its drawing of the peripheral rim on the outer shell of the projector's slide tray. Magnet 377 is thus disposed to move with carrier 375 such that upon each full revolution of the carrier it is brought into alignment with and dependent over an electromagnet pole end of coil 373. A resistance 379 is connected across leads 374 and 376 so as to shunt the electromagnet coil and desensitize its area of response to magnet 377 whereby such response is closely limited about the pole end. Consequently, operational termination signals which arise from the coil response to the magnet are not prematurely developed, and occur only when the appropriate slide slot is in projection position. By inserting an opaque slide in the slide holder provided to locate each slide across the optical axis of the projector, light is cut off from the screen on first turning on the projector. Upon the sensing of a slide change trigger signal, as will be hereinafter more fully explained, a picture transparency slide in the 1 slot of carrier 375 will replace the opaque slide.

In view of the particular polarities characterizing the effective, or facing ends of coil 373 and magnet 377, an operational signal output from the electromagnet is obtained only when the carrier is moving in one direction. Thus, a reversal of direction in which carrier 375 was moving magnet 377 to produde a signal from coil 373, would produce only a reverse and ineffective signal as magnet 377 traverses the coil in an opposite direction. Allowing magnet 377 to be reversed in a holder therefor affixed to carrier 375, or actuating a reversing switch connected across leads 374 and 376 by which the polarity of coil 373 may be reversed as desired, would provide additional two position flexibility in stop operations of the slide carrier drive. This result follows from the fact although in this instance an ineffective signal is produced when magnet 377 is approaching coil 373, the signal produced when magnet 377 is leaving the area directly above the adjacent end of the coil is effective and projector operation would be stopped at the next slide slot position.

Connections made to a further terminal plug 380 facilitates an energizing circuit to a projection lamp 382 in the projector. Separate leads 384 and 385 from the lamp extend through the conductively linked plug terminals a-c and b-d, and from the plug to leads 387 and 388 connected to an upper contact 213 of relay 190, and to source negative, respectively. A lead 390 additionally connects lead 397 to upper contacts 211 and 213 of the relay, and corresponding to parallel connections by lead 392 extends a circuit from contact arm 205 to contact arms 203 and 204 of the relay. Thus relay activation moving the contact arms to engage the upper fixed contacts completes a lamp energizing circuit from source positive on leads 393 and 392, through three sets of contacts on relay 190, leads 390, 387, 384, 385, and lead 388 to source negative.

Operation of a preferred embodiment of the invention as disclosed with reference to FIGS. 3A and 3B, is initiated by a depression of start button 224, and in response thereto the activation of relay 190 upon the energization of its start electromagnet 192. The electromagnet energization circuit extends from source positive at button 224, then engaged with contact 228, and through lead 234, diode 236, lead 238, and lead 239 to source negative at the coil of electromagnet 192.

Contact arms 200 to 205, are shifted upward by the electromagnet, and engage fixed contacts 208 to 213, wherein they are held mechanically by relay latch mechanism following release of button 224 to its normal closure on fixed contact 230. Thus source positive potential available at contact arm 200 is applied by way of contact 208, and leads 256 and 259, to activate relay operated switch 257 and apply power to tape recorder activation arrangement 250 wherein tape drive motor 252 and magnet lock of guide roller 254 are energized, lead 258 extending to input terminals of panel 280 wherein further connections transmit the potential to tape playback and speaker driver circuitries, and lead 278 extending to the projector for activating devices 276 therein including a lamp heat blower.

At such time that a slide-change operation is required, the recorded material picked by one of the tape playback heads 288 and 290 contains a 30 cycle signal which by way of the amplification equipment of the audio controls associated with panel 280, and filter 320, is transmitted on lead 324 to the amplifier having connections on panel 167. The amplifier output made available at terminals *f* and *g* on panel 167, is in turn transmitted on leads 165 and 166 to lamp 153 of the slide change command signal sensor component 150. A capacitor 163 connected across the lamp circuit leads smooths the amplifier output in a well known manner. Since relay 190 is latched in the start condition its contact arms 201 and 202 are held engaged with fixed contacts 209 and 210 of the relay, respectively, such that a slide changer mechanism energizing circuit comprising leads 160 and 161, is extended by way of the engaged relay contacts' connections through leads 354, 355, 348, 352, 362, normally closed switch 360, and lead 364, and completed upon conduction of thyristor 156 of component 150. Consequently, when a slide change command signal on leads 165, 166, causes lamp 153 to light, the resistance of associated photocell 155 is lowered sufficiently to trigger the conduction of thyristor 156, as explained in describing the circuit of FIG. 2, with the result that slide change devices 346 in the projector are supplied with power from an a-c source by way of a circuit completed through the anode electrodes of thyristor 156. Accordingly, as each 30-cycle signal is played back from the program tape a signal is derived for effectuating the energization of slide changing devices in the projector.

After the last picture transparency slide has been projected and together therewith the completion of the playback of that part of tape 14 carrying appertaining message material, a slide-change trigger signal occurs and carrier 375 shifts to place in the projector's optical axis the first of a series of opaque slides which fills up all remaining slots through to the last slide slot 80 of the carrier. About a fifteen second interval of signal-free tape, or tape containing postlude music, could be allowed to follow the last slide trigger signal. Thereafter, playback of the long inaudible signal starts and in response thereto the remaining opaque slides cycle through at about one per second. In effect, cycling of slide changing devices 346 continues as lamp 153 is maintained energized and operative in slide change signal sensor component 150 as a result of the continuing long signal giving rise to a slide change command signal on leads 165 and 166, in the manner previously described. As carrier 375 moves to replace the slide which was taken from its slot 80 with the opaque slide from its 0 slot, in the manner hereinbefore explained with references to the previously identified patent to H. T. Robinson, magnet 377 moves toward a position of alignment over electromagnet coil 373 and a signal is generated to initiate a termination sequence of the program cycle. The signal from coil 373 is transmitted on leads 374 and 376, through the terminals of plug 370, and on leads 371 and 372 from the plug to the stop amplifier by way of its panel 180 and terminals *a, b,* and *m, l, k,* thereon. The amplifier responds by producing a current output made available at terminals *f* and *g* of its panel 180, and on leads 177 and 178 from these terminals transmitting this current to lamp 170 of stop sensor component 152. Light from lamp 170 reaching photocell 172 lowers its resistance in the gate circuit of thyristor 176 which responds by conducting to complete a circuit wherein stop electromagnet 194 of relay 190, is energized. This energizing circuit is traceable from source positive at start button 224, and by way of lead 184, the anodes of thyristor 176, lead 182, diode 244, lead 246, the coil of electromagnet 194, and lead 248 to source negative. Relay 190 is operated thereby to shift contact arms 200 to 205, inclusive, back to where they engage fixed contacts 216 to 221, respectively.

When power for energizing electromagnets 192 and 194 is supplied from an alternating current source, a transient suppression circuit 400 is effective between the electromagnet coil circuits. Circuitry 400 comprises capacitors 401 and 402, connected in parallel so as to shunt the coils, and diodes 403 and 404 which are connected between the coil circuits to protect the capacitors by holding down voltage spikes. A neon pilot light lamp 179, connected in series with a protective resistance 181, shunts across the coil of stop electromagnet 194 whereby it is energized when the stop control becomes momentarily effective as was hereinabove explained. Lamp 179 is located along with lamp 168, which light up with each slide change signal in sensing component 150, on a monitoring panel located for visual inspection by the operator of the apparatus disclosed herein.

The circuits previously described as completed by relay 190 through the engagement therein of contact arms 200 and 203 to 205 with fixed contacts 208 and 211 to 213, and by which projector devices 276, tape playback equipment, tape drive circuitry 250, and projection lamp 382 are initially activated and energized, are opened when the relay's contact arms are shifted by operation of stop electromagnet 194, and latched as repositioned. Moreover, the automatic slide sequencing control over slide changer devices 346 is rendered inoperative upon the disruption of its circuitry at fixed relay contacts 209 and 210 when contact arms 201 and 202 are shifted. Nevertheless, the cooling blower control by devices 276, the tape playback equipment, and tape motor and guide roller circuitry 250 are maintained operative by means of a further energizing circuit therefor completed when contact arms 200 to 202 engage with the respective fixed contacts 216 to 218 of relay 190. The positive potential at contact arm 200 then becomes effective in a circuit traceable through fixed contact 216, lead 390, fixed contact 218, contact arm 202 closed thereon, lead 160, thyristor 156 being held conductive by photocell 155 in component 150 since lamp 153 thereof remains energized in response to the continuing long signal, lead 161, contact arm 201 closed on fixed contact 217 of relay 190, lead 253, and completed on lead 259, which effects the closure switch 257 in the energizing circuit to the playback equipment, and by way of leads 260 and 278 to circuitry 250, and devices 276, having further connections to source return. Although the current energizing tape playback control circuitry 250, as well as blower motor control devices 276, would appear to be cut-off for an instant during a time lapse between the shift from slide change mode to blow-down or termination mode, these units remain operational in the power ciruit through relay switch 257 which is relatively less responsive than relay 190. Moreover, the long signal control continues effective since the long signal continues effectively uninterrupted due to the inertia of the parts rotating in tape motor 252 acting to maintain a drive to tape 14, from which the long signal is read, during the fast acting operation of relay 190 to shift its contact arms to engage fixed contacts 216 to 221, and capacitor 163 starts to discharge across slide-change command signal amplifier output leads 165 and 166 so as to maintain current in the energizing circuit to lamp 153 during a possible drop in the amplifier output. Thus, a continuous tape signal is amplified to keep lamp 153 turned on without interruption, and component 150 continues acting after the aforesaid instant to maintain the dynamic equilibrium operatively associating the tape drive motor and blower with the switch lamp control. Accordingly, tape drive mechanisms, playback equipment, and heat blow-down blower function as long as lamp 153 is maintained energized in response to detection of the 30 cycle signal extended to the end of the tape. Eventual completion of the tape sequence and the long signal therewith, opens the energizing circuits through thyristor 156, since conduction thereof ceases when slide change amplifier at panel 167 no longer provides an energizing signal to lamp 153. Consequently, operting potential to circuitry 250, the playback equipment, and the blower control devices 276 is now also cut off.

At the conclusion of the termination sequence, wherein the latter part of the long signal, or part of the recording thereof which remains to be detected after the aforementioned stop control is momentarily effective, constitutes a control setting the time duration for a blow-down program, all operations stop as previously described. This cessation of all recorded signals brings the tape to its regular stopping position, ready for the next performance. Therefore, since the magnetic tape is thus employed to determine a requisite time for a blow-down operation whereby at the end of every operational cycle the entire signal has been utilized and the tape is returned to a starting position to correspond to a previously reset-to-start positioning of the slide carrier, nothing of the sequence remains to be interpreted as a slide change or other control signal for the next performance of the program, and employment of any time delay apparatus between performances is obviated.

Other embodiments of the invention provide recorded control signals as part of messages in both channels of a stereotape recording, or in additional channels of different tapes, which are effective to determine the operation of two or more projectors by way of further directing arrangements. Therefore, while a preferred form of the invention has been illustrated and described herein, it is understood that the invention is not limited thereby but is susceptible to change in form and detail.

What is claimed is:

1. A control arrangement for coordinating the functions of audio-visual equipment, said arrangement comprising a multiplicity of electrical circuits, and electrical power source means adapted to energize circuitries of said multiplicity of circuits in response to automatic switching therein determining selective applications thereto of said source means, said arrangement further comprising an image representation slide projection apparatus and an electrically operated record playback means, said record playback means intermittently providing for use in said arrangement a predetermined sequence of generally uniform relatively short electrical signals followed by a relatively long electrical signal of a predetermined duration, said projection apparatus comprising an electrically operated mechanism for projecting said image presentation slides, which is operable at a specific location in said apparatus, projection light means, cooling means for said projection apparatus, and a carrier having a multiplicity of seats which individually receive therein a different one of a multiplicity of distinct ones of said image representation slides, said slides being adapted to be individually unseated and deposited into said projecting mechanism for a projection of said images thereof from said projection apparatus and subsequently reseated in said carrier, electrically operated means for displacing said carrier and changing each said deposited slide in said projecting mechanism, one slide for another, upon stepped displacements of said carrier moving respective ones of said seats thereof to said specific location, and said playback means comprising means for electrically reading out manifestations of said relatively short and long electrical signals from a running record storage thereof, a record storage drive for running said record, and means electrically connected to receive said electrical read-out from said record which when energized by a power supply of said power source means is operable to derive more fully said short and long electrical signals in response to operation of said means for reading out, and supply said derived short and long electrical signals in said arrangement, and said arrangement still further comprising:

a circuits controlling relay actuatable from one condition thereof to another condition thereof wherein a first circuitry of said multiplicity of circuits is switched to complete first connections of said first circuitry to said power supply and disrupt second connections of said first circuitry to said said power supply previously established in said one condition of said relay, said relay comprising actuating means therefor having first and second energizable means for directing said relay to said one and said another conditions thereof, respectively, said first and second energizable means being operable by alternate energization from a further power supply of said power source means to alternately establish said one and another conditions of said relay, equipment functions start switch means operable to complete a second circuitry of said multiplicity of circuits which energizes said second energizable means for directing said relay and obtains actuation of said relay to said another condition thereof whereby said first circuitry is energized by circuit switching which completes first connections of said first circuitry to said power supplies of said power source means and initiates operation of said electrically operated slide projecting mechanism, projection light means, projection apparatus cooling means, and record playback means, a first circuitry controlling signal sensor unit for said arrangement electrically connected to said means deriving said short and long electrical signals, said first sensor unit being activatable in response to said derived short electrical signals and subsequently to said derived long electrical signal to switch from an off condition thereof to an on condition thereof as long as any such signal persists, wherefore further circuitry of said first circuitry is switched to complete further connections thereof to said power supply, and to further energizing means of said arrangement enabling operation of said electrically operated carrier displacing and slide changing means, means adapted to generate an electrical signal pulse indicative of said carrier at a terminal disposition of said stepwise displacement thereof, said pulse generating means comprising a third circuitry having connections to said power supply, an electrical signal pulse producing means electrically connected in said third circuitry, said pulse producing means being affixed in said projection apparatus adjacent said carrier, an activator element for said pulse producing means mounted on said carrier at a predetermined terminus representative location thereof whereby displacement of said carrier to where said activator element traverses said pulse producing means in close proximity thereto generates a carrier terminus signal pulse, a second circuit controlling signal sensor unit for said arrangement, a fourth circuitry adapted by activation of said second sensor unit to be completed to said further power supply and to said first energizable means for directing said relay to said one condition thereof, a fifth circuitry connected to said third circuitry and said second signal sensor unit which activates upon application in said fifth circuitry of said terminus signal pulse from said pulse generating means to effectuate switching of said relay to said one condition thereof, a sixth circuitry adapted by completion thereof to said power supply through connection of said second circuit connections, completed in said one condition of said relay, and said first signal sensor unit in said on condition thereof, to connect said power supply in said first circuitry for enabling operation of said record playback means and said projection apparatus cooling means, whereby switching of relay to said one condition thereof causes disruption of said first circuitry first connections and establishes completion of said first circuitry second connections and thereby deactivates said projection light means and disables said response of said further energizing means of said carrier displacing and slide changing means to said derived short and long electrical signals, and concurrently therewith continues energization of said record playback means and said projection apparatus cooling means until completion of said predetermined duration of said derived long electrical signal.

2. The control arrangement of claim 1 wherein said circuits controlling relay is a latching relay comprising first and second opposing sets of fixed contacts which are respectively connected as integral parts of said first and second connections of said first circuitry, and shiftable contact arms which in said another condition of said controller are engaged with said first set of said fixed contacts, and in said one condition of said controller are engaged with said second set of fixed contacts.

3. The control arrangement of claim 1 wherein said first and second circuitry controlling signal sensor units each comprise an enclosure containing a switching control lamp adapted to light therein and having in close proximity thereto a photocell operably responsive to said light, said photocell having connections in the gate circuit of a thyristor, said first sensor unit having said thyristor thereof connected to conduct in said further circuitry of said first circuitry for enabling operation of said carrier in stepwise displacements and changing said image representations slides in said projection mechanism, said switching control lamp of said first sensor unit being connected to said means operable to derive said short and long electrical signals whereby said electrical signals derived therefrom energize said first switching control lamp and condition said photocell in close proximity thereto to permit said thyristor to conduct in said further circuitry of said first circuitry, and said second sensor unit having said thyristor thereof connected to conduct in said fourth circuitry for activating said first energizable means for directing said relay to said one condition thereof, said switching control lamp of said second sensor unit being connected in said fifth circuitry and energizable in response to a said terminus signal pulse therein whereby said photocell in close proximity thereto permits said second sensor unit thyristor to conduct in said fourth circuitry to activate said first energizable means.

4. The control arrangement of claim 1 wherein said means generating a said carrier terminus pulse comprises an electromagnet coil as said signal pulse producing means thereof, and a magnet as said activator element thereof, said electromagnet coil having one pole thereof closer to said magnet than the other pole thereof whereby a pass of said magnet in one direction across said one pole produces a carrier terminus indicating signal whereas a pass of said magnet across said one pole in a reversal of directions produces a reversed and nonoperational signal.

5. The control arrangement of said claim 1 wherein said record playback means is a tape recorder and said record storage drive is an energizable tape drive for a tape record whereon said manifestations of said short and long electrical signals are of a predetermined relatively inaudible frequency among multi-frequency audible message electrical signals readable from said tape record, said means operable to derive said electrical signals comprising signal frequency filter means limited to an output of signals at said predetermined frequency, audio output means, and means amplifying and supplying said derived short, long and message electrical signals to said filter and audio output means whereby said filter means passes said derived short and long electrical signals to said first circuitry controlling signal sensor unit and said derived short, long, and multi-frequency electrical signals are passed concurrently to said audio output means.

* * * * *